US005939646A

United States Patent [19]

Fowler

[11] Patent Number: 5,939,646

[45] **Date of Patent: *Aug. 17, 1999**

[54] SHEET MEDIA WEIGHT DETECTOR

[75] Inventor: Pat Fowler, Middleton, Id.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,993

[22] Filed: Feb. 26, 1997

[51] Int. Cl.[6] .......... G01L 3/02

[52] U.S. Cl. .......... 73/862.193; 73/862.23; 271/10.02

[58] Field of Search .......... 73/760, 862.193, 73/862.23, 862.29, 862.44, 865, 862.541; 271/10.02, 4.02

[56] References Cited

U.S. PATENT DOCUMENTS

| | | | |
|---|---|---|---|
| 4,206,912 | 6/1980 | Pearson | 271/154 |
| 4,835,573 | 5/1989 | Rohrer et al. | 355/308 |
| 4,852,785 | 8/1989 | Bettendorf et al. | 226/42 |
| 5,013,981 | 5/1991 | Rodi | 318/67 |
| 5,169,249 | 12/1992 | Kitabatta | 400/582 |
| 5,270,563 | 12/1993 | Mahoney | 177/145 |

FOREIGN PATENT DOCUMENTS

| | | |
|---|---|---|
| 0650100 | 4/1995 | European Pat. Off. . |
| 57-004062 | 1/1982 | Japan . |
| 05066627 | 3/1993 | Japan . |
| 06230626 | 8/1994 | Japan . |

*Primary Examiner*—Max Noori

[57] ABSTRACT

A method and device that automatically measures and monitors the pick/feed motor torque as an indicator of paper weight, and controlling pertinent printer operations according to the measured torque. The method of the invention includes the steps of measuring the torque output of the motor during a pick/feed operation and controlling at least one printer operation according to the torque measurement. Preferably, the torque is measured by measuring the electrical current drawn by the pick/feed motor during the pick/feed operation.

11 Claims, 3 Drawing Sheets

SHEET MEDIA WEIGHT DETECTOR

FIELD OF THE INVENTION

The invention relates generally to detecting the weight of paper in printers, copiers and other image forming machines and controlling printer operations according to the detected paper weight. More particularly, the invention relates to a method and device that automatically measures and monitors the pick/feed motor torque as an indicator of paper weight in printers that use a motor driven pick/feed mechanism.

BACKGROUND OF THE INVENTION

Automatically detecting the weight of the paper used in a printer, copier or other image forming machine is desirable to help maintain good print quality. In laser printers and other electrophotographic image forming machines, the weight of the paper, as a discrete characteristic of the paper and as an indicator of paper thickness, is an important factor in determining the fusing temperature and pressure, the speed at which the paper is advanced through the printer and the transfer current needed for good print quality. Electrophotographic printers typically do not detect and automatically adjust for heavy paper—paper having a basis weight greater than about 28 pounds. Some printers allow the operator to manually select a heavy paper setting in the computer printer driver to maintain good print quality on heavy paper. Manual selection, however, is only effective if the operator is able to, and actually does, select the correct heavy paper setting. Manual selection is sometimes not practicable even for a knowledgeable and diligent operator, particularly when the printer paper is changed frequently among different weight and thickness papers and from several different input sources.

SUMMARY OF THE INVENTION

The present invention is directed to a method and device that automatically measures and monitors the pick/feed motor torque as an indicator of paper weight, and controlling pertinent printer operations according to the measured torque. The method of the invention includes the steps of measuring the torque output of the motor during a pick/feed operation and controlling at least one printer operation according to the torque measurement. Preferably, the torque is measured by measuring the electrical current drawn by the pick/feed motor during the pick/feed operation.

The pick/feed mechanism must apply a larger separation force to heavy weight papers, which are heavier and stiffer than light weight papers, to successfully perform the pick/feed operation. The pick/feed motor must, therefore, apply a larger torque to the pick/feed rollers. The amount of electrical current drawn by the motor is related to the pick/feed torque output of the motor, which is related to the separation force and the weight of the paper. Thus, measuring the current by the pick/feed motor allows the printer controller to determine the weight of the paper or other sheet media and adjust printer operations accordingly.

An image forming device configured according to the invention includes a print engine controller, a formatter, a print engine, a motor driven pick/feed mechanism, and a motor torque sensing circuit. The motor torque sensing circuit is electrically connected between the pick/feed motor and the print engine controller. Any suitable sensing circuit that measures the electrical current drawn by the pick/feed motor during a pick/feed operation, or that measures the changes in electrical current drawn during pick/feed operations, may be used. The sensing circuit, for example, may include a shunt resistor electrically connected to the motor and an operational amplifier connected between the shunt resistor and the controller. The voltage developed across the shunt resistor is inputted to the operational amplifier. The output voltage from the operational amplifier is inputted to the print engine controller, and serves as the basis for computing the weight of the paper.

DETAILED DESCRIPTION OF THE INVENTION

Figure 1:
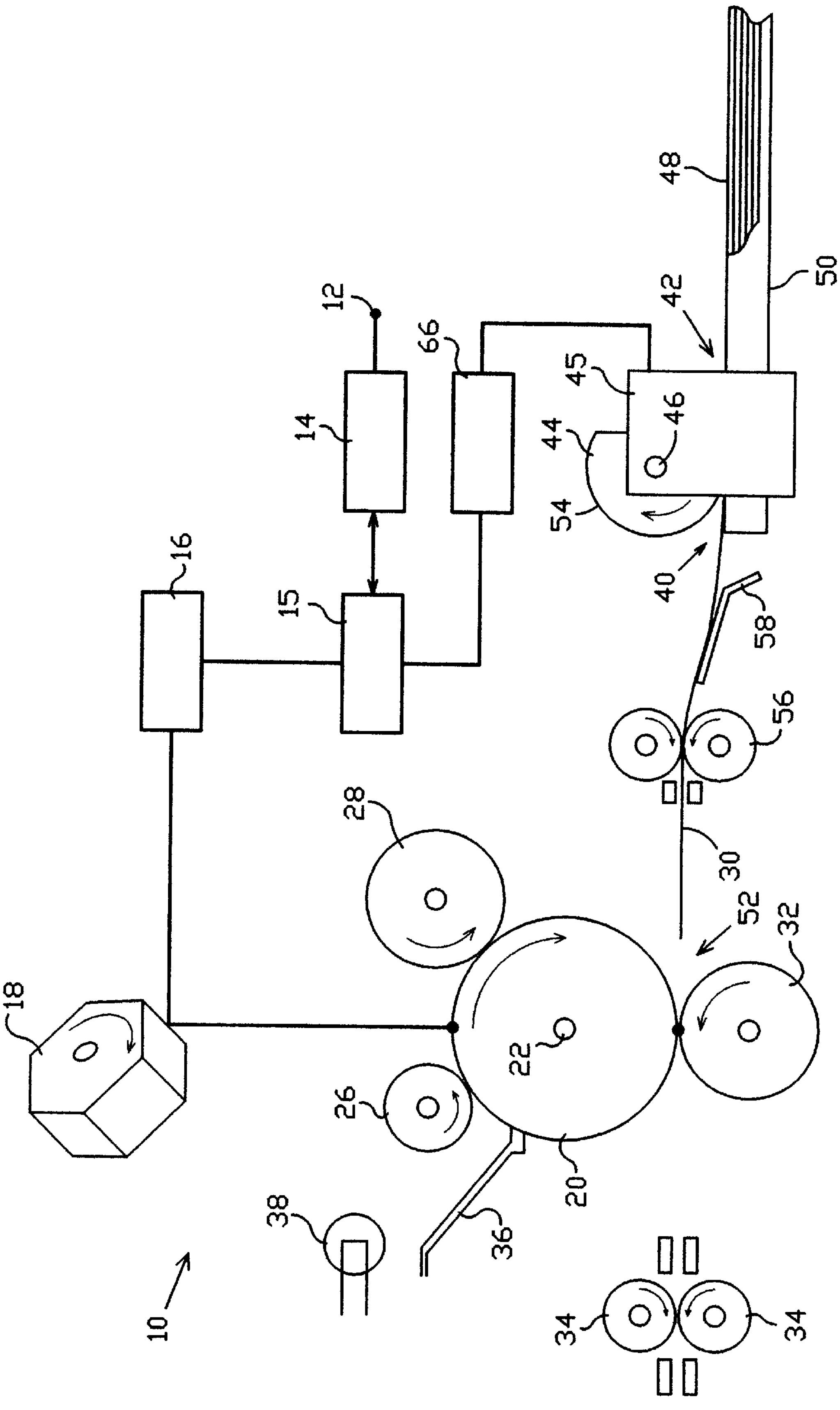
FIG. 1 is a representational elevation view of a laser printer that includes the sheet media weight detector of the present invention.

Although it is expected that the sheet media detector of the present invention will be most useful in electrophotographic printing devices such as the laser printer illustrated in FIG. 1, the detector can be used in the various sheet media type printers, copiers and other image forming devices. FIG. 1 illustrates a conventional laser printer, designated by reference number 10, adapted for use with the invented sheet media detector. In general, a computer transmits data representing an image to input port 12 of printer 10. This data is analyzed in formatter 14, which typically consists of a microprocessor and related programmable memory and page buffer. Formatter 14 formulates and stores an electronic representation of each page that is to be printed. Once a page has been formatted, it is transmitted to the page buffer. The page buffer breaks the electronic page into a series of lines or "strips" one dot wide. This strip of data is then sent to the printer controller 15. Controller 15, which also includes a microprocessor and programmable memory, drives laser 16 and controls the drive motor(s), fuser temperature and pressure, and the other print engine components and operating parameters.

Each strip of data is used to modulate the light beam produced by laser 16. The light beam is reflected off a multifaceted spinning mirror 18. As each facet of mirror 18 spins through the light beam, it reflects or "scans" the beam across the side of a photoconductive drum 20. Photoconductive drum 20 rotates just enough that each successive scan of the light beam is recorded on drum 20 immediately after the previous scan. In this manner, each strip of data from the page buffer is recorded on photoconductive drum 20. Toner is electrostatically transferred from developing roller 28 toner onto photoconductive drum 20 according to the data previously recorded on the drum. The toner is thereafter transferred from photoconductive drum 20 onto paper 30 as paper 30 passes between drum 20 and transfer roller 32. Drum 20 is cleaned of excess toner with cleaning blade 36, completely discharged by discharge lamps 38 and then recharged by charging roller 26.

Each sheet of paper 30 is advanced to the photoconductive drum 20 by a pick/feed mechanism 42. Pick/feed mechanism 42 includes feed rollers 44 coupled to a motor 45. Typically, a 24 volt d.c. servo motor is used to drive feed rollers 44. Motor 45 drives feed rollers 44 through shaft 46 and, usually, through a suitable reduction gear train (not shown). Motor 45 may also drive one or more other printer components, such as registration rollers 56. The paper stack 48 is positioned in input tray 50 to allow sliding passage of the top sheet of paper 30 into pick/feed area 40 at the urging of feed rollers 44. Feed rollers 44 have a frictionally adherent outer surface 54. In operation, as feed rollers 44 rotate, the frictionally adherent outer surface 54 of feed rollers 44 contacts the upper surface of paper 30 and pulls it into pick/feed area 40. As the leading edge of paper 30 moves through pick/feed area 40, it is engaged between a pair of registration rollers 56. Ramp 58 helps guide paper 30 into registration rollers 56. Registration rollers 56 advance paper 30 fully into image area 52 until it is engaged between drum 20 and transfer roller 32 and toner is applied as described above.

Figure 2:
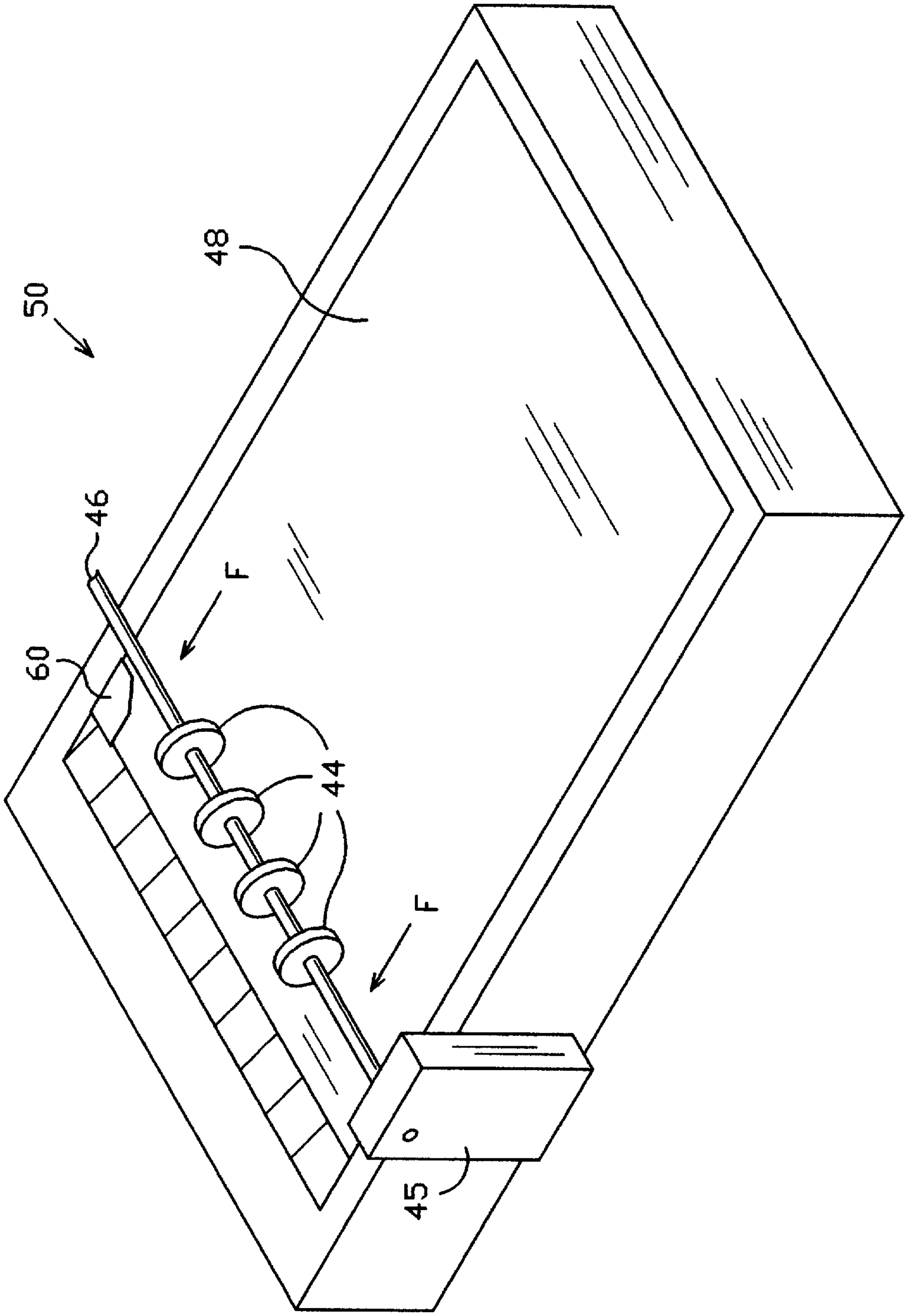
FIG. 2 is a perspective view of a printer paper cassette showing the pick/feed roller and motor.
Figure 3:
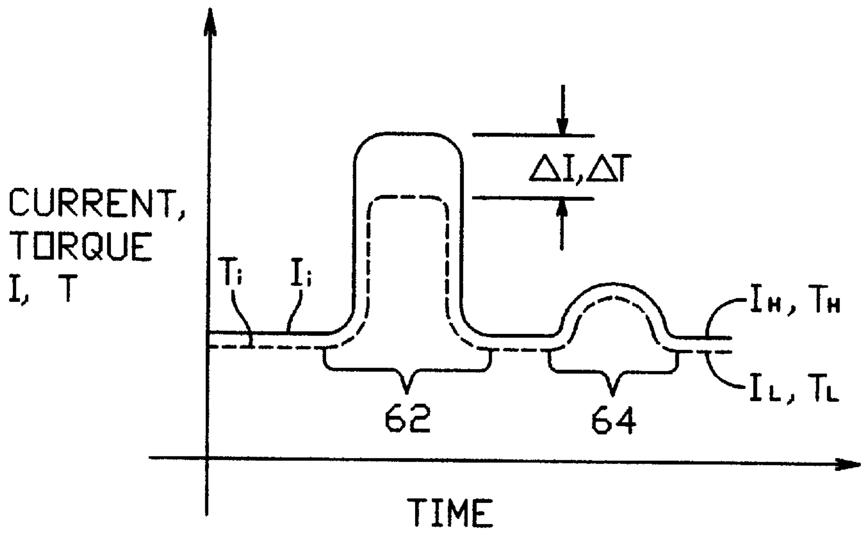
FIG. 3 is a graph illustrating the input current and torque output for the pick/feed motor for different weight papers.

Referring to FIG. 2, during a pick/feed operation, feed rollers 44 apply a separation force F sufficient to drive paper 30 past edge separators 60 and over the next to top sheet in the paper stack 48. Similarly, motor 45 applies the necessary pick/feed torque T through shaft 46 to turn feed rollers 44. Feed rollers 44 must apply a larger separation force F to heavy weight papers, which are heavier and stiffer than light weight papers, to successfully perform the pick/feed operation. Motor 45 must, therefore, apply a larger torque to shaft 46 to turn feed rollers 44. The amount of electrical current I drawn by motor 45 is related to the pick/feed torque T output of motor 45, which is related to the separation force F and the weight of paper 30. Thus, the input electrical current is related to the weight of paper 30. That is, motor 45 will draw more current to deliver more torque for heavy weight papers. Conversely, motor 45 will draw less current to deliver less torque for light weight papers. This varying current draw is illustrated graphically in FIG. 3. Referring to FIG. 3, the solid line indicates the current $I_H$ drawn and torque $T_H$ delivered by motor 45 for heavy weight paper. The dotted line indicates the current $I_L$ drawn and torque $T_L$ delivered by motor 45 for light weight paper. The current and torque rise sharply during a pick/feed operation, indicated by reference number 62. Shortly after the pick/feed operation, the current and torque rise again, as indicated by reference number 64, as motor 45 engages and drives registration rollers 56.

Although the relationship between the electrical current input and paper weight will vary depending on the components and configuration of a particular pick/feed system, this relationship can be established for each system empirically by measuring the motor current and torque values for different weight papers. Once this relationship is established, the input electrical current to motor 45 is measured and monitored by detector 66 and fed back to printer controller 15, as shown in FIG. 1, where the weight and thickness of paper 30 can be computed according to the appropriate algorithm or model.

Figure 4:
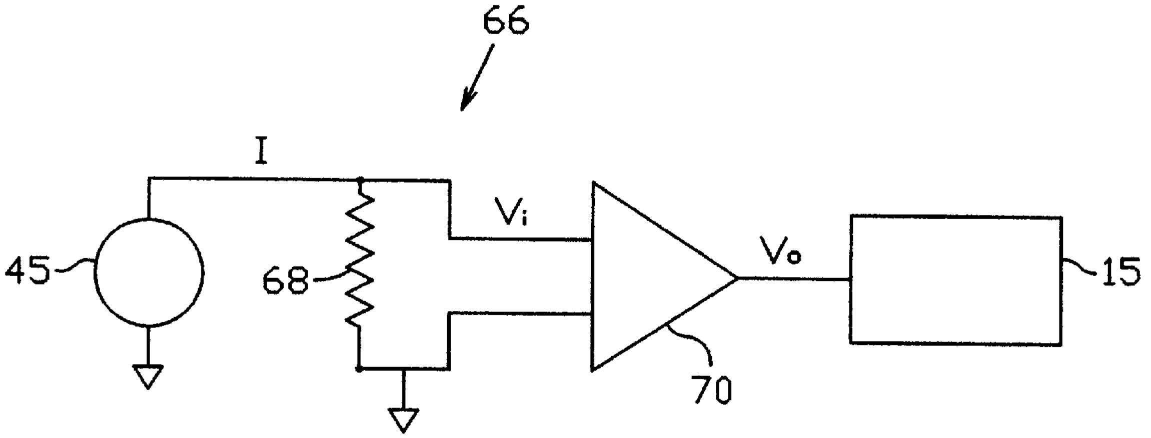
FIG. 4 is a schematic diagram of a motor torque sensing circuit.

Detector 66 may be any suitable sensing circuit that measures the electrical current drawn by motor 45 during a pick/feed operation, or that measures the changes in electrical current drawn the pick/feed operations. One example of a suitable sensing circuit is illustrated in FIG. 4. Referring to FIG. 4, input current I is shunted through sensing resistor 68. The voltage $V_i$, developed across sensing resistor 68 is inputted to operational amplifier 70. The output voltage $V_o$ from operational amplifier 70 is transmitted to printer controller 15. Various other sensing circuits could be used. The current drawn by motor 45 could be sensed magnetically to induce current through a sensing wire. This current is then inputted to a transimpedance operational amplifier (a current-voltage converter). Or, a Hall effect sensor could be used. The servo circuit feedback line could also be used to measure the electrical current drawn by motor 45.

Preferably, detector 66 is calibrated to account for any drift or other changes occurring over time in the current drawn by motor 45. Referring again to FIG. 3, detector 66 is calibrated by measuring the output torque $T_i$, and the corresponding current draw $I_i$, just prior to the pick/feed operation. Then, the torque and current measured during the pick/feed operation $T-T_i$ and $I-I_i$ will reflect the separation force and paper weight, not any drift or other change in the pre-pick current draw.

The output from detector 66 is utilized by printer controller 15 to automatically control and direct operations of those print engine components and printing parameters that depend on paper weight or thickness, such as fusing temperature and pressure, the speed at which the paper is advanced through the printer and the transfer current (the electric current or electro-static force that moves the toner onto the paper). These parameters and the components that control them can all be adjusted by controller 15 according to the output of detector 66.

While the present invention has been shown and described with reference to the foregoing preferred embodiments, it will be apparent to those skilled in the art that other forms and details may be made thereto without departing from the spirit and scope of the invention as defined in the following claims.

What is claimed is:

1. A method for detecting the weight of sheet media in printers, copiers and other image forming machines, comprising:

driving a pick/feed mechanism with an electric motor;

measuring torque output of the motor during a pick/feed operation;

establishing a relationship between the torque output of the motor during the pick/feed operation and the weight of the sheet media; and controlling at least one printer operation according to the measured torque and the corresponding weight of the sheet media.

2. A method according to claim 1, wherein the step of measuring torque comprises measuring electrical current drawn by the motor during the pick/feed operation and further comprising establishing a relationship between the electrical current drawn by the motor during the pick/feed operation and the weight of the sheet media.

3. A method according to claim 1, further comprising transmitting the torque measurement to a print controller.

4. A method according to claim 2, further comprising transmitting the current measurement to a print controller.

5. A method according to claim 1, wherein the image forming machine is an electrophotographic image forming machine and further comprising controlling fusing temperature according to the torque measurement and the corresponding weight of the sheet media.

6. A method according to claim 1, wherein the image forming machine is an electrophotographic image forming machine and further comprising controlling fusing pressure according to the torque measurement and the corresponding weight of the sheet media.

7. A method according to claim 1, wherein the image forming machine is an electrophotographic image forming machine and further comprising controlling transfer current according to the torque measurement and the corresponding weight of the sheet media.

8. A method according to claim 1, wherein the image forming machine is an electrophotographic image forming machine and further comprising controlling a rate at which the sheet media is advanced through the machine according to the torque measurement and the corresponding weight of the sheet media.

9. A method for detecting the weight of sheet media in printers, copiers and other image forming machines, comprising:

driving a feed roller with an electric motor;

causing the feed roller to apply a separation force to a top sheet in a stack of sheet media;

defining a relationship between the weight of each sheet of sheet media and the separation force applied to the top sheet;

measuring the separation force; and controlling at least one printer operation according to the measured separation force and the corresponding weight of the sheet media.

10. A method according to claim 9, wherein:

the step of causing the feed roller to apply a separation force comprises causing the motor to apply a torque to the feed roller;

the step of measuring the separation force comprises measuring the torque applied to the feed roller; and the method further comprises defining a relationship between the torque applied to the feed roller and the weight of the sheet media.

11. A method according to claim 10, wherein the step of measuring the torque applied to the feed roller comprises measuring electrical current drawn by the motor during the application of the torque to the feed roller and the method further comprises defining a relationship between the electrical current drawn by the motor during the application of the torque to the feed roller and the weight of the sheet media.

* * * * *